(12) United States Patent
Sonobe et al.

(10) Patent No.: US 7,772,310 B2
(45) Date of Patent: Aug. 10, 2010

(54) POLYACETAL RESIN COMPOSITION

(75) Inventors: Kenya Sonobe, Okayama (JP); Noritaka Tanimura, Okayama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 12/550,165

(22) Filed: Aug. 28, 2009

(65) Prior Publication Data

US 2009/0318600 A1 Dec. 24, 2009

Related U.S. Application Data

(62) Division of application No. 10/597,336, filed as application No. PCT/JP2005/000600 on Jan. 19, 2005, now Pat. No. 7,625,969.

(30) Foreign Application Priority Data

| Jan. 21, 2004 | (JP) | 2004-012980 |
| Mar. 26, 2004 | (JP) | 2004-091048 |
| Mar. 26, 2004 | (JP) | 2004-091049 |

(51) Int. Cl.
C08K 3/20 (2006.01)
(52) U.S. Cl. ...................... 524/425; 524/593
(58) Field of Classification Search ................ 524/425, 524/593
See application file for complete search history.

(56) References Cited

U.S. PATENT DOCUMENTS

| 4,456,710 A | 6/1984 | Lüders et al. |
| 5,106,896 A | 4/1992 | Endo et al. |
| 6,489,388 B1 | 12/2002 | Kurz et al. |
| 6,790,385 B2 | 9/2004 | Schleith et al. |
| 6,936,651 B2 | 8/2005 | Flexman et al. |
| 2004/0242747 A1 | 12/2004 | Nandi |
| 2004/0258906 A1 | 12/2004 | Scaramuzzino |

FOREIGN PATENT DOCUMENTS

| DE | 1-0009282 | 8/2001 |
| EP | 0 340 931 | 11/1989 |
| EP | 0 580 872 | 2/1994 |
| GB | 1123358 | 8/1968 |
| JP | 1-170641 | 7/1989 |
| JP | 1-263145 | 10/1989 |
| JP | 5-51514 | 3/1993 |
| JP | 11-302497 | 11/1999 |
| JP | 2001-11284 | 1/2001 |
| JP | 3157579 | 2/2001 |
| JP | 2004-506772 | 3/2004 |
| WO | 02/14429 | 2/2002 |

OTHER PUBLICATIONS

English Language Abstract of JP 5-51514 dated Mar. 2, 1993.
English Language Abstract of JP 1-170641 dated Jul. 5, 1989.
English Language Abstract of JP 11-302497 dated Nov. 2, 1999.

*Primary Examiner*—Bernard Lipman
(74) *Attorney, Agent, or Firm*—Greenblum & Bernstein, P.L.C.

(57) ABSTRACT

The present invention provides a polyacetal resin composition comprising (I) a polyacetal resin; and per 100 parts by weight thereof, (II) more than 5 parts by weight but less than 100 parts by weight of calcium carbonate, wherein the calcium carbonate has an average particle diameter of 0.1 to less than 1.5 μm and an average aspect ratio (L/D) which is a ratio of average major axis (L) of particles to average minor axis (D) of particles (D) of 3 or less; (III) 0.005 to 10 parts by weight of an organic acid; and (IV) 0 to less than 0.05 part by weight of a fatty acid ester, wherein the amount of Na relative to Ca is 250 ppm or less while the amount of Sr relative to Ca is 500 to 2500 ppm. The resin composition of the invention is excellent in a balance of thermal stability and mechanical properties, such as rigidity and toughness, also excellent in anti-creep life, fatigue resistance and acid resistance, so that it can be suitably used in various fields, such as automobile, electrical/electronic and other industries.

11 Claims, No Drawings

POLYACETAL RESIN COMPOSITION

CROSS REFERENCE TO RELATED APPLICATION

This is a divisional application of U.S. patent application Ser. No. 10/597,336, now U.S. Pat. No. 7,625,969, which is a U.S. National Stage of PCT/JP2005/000600, filed Jan. 19, 2005, and which are hereby incorporated by reference herein their entirety.

TECHNICAL FIELD

The present invention relates to a polyacetal resin composition comprising a polyacetal resin and calcium carbonate having a specific shape and an organic acid and also containing specific amounts of Na and Sr, which is excellent in a balance of thermal stability and mechanical properties, such as rigidity and toughness, and also excellent in anti-creep life, fatigue resistance and acid resistance.

BACKGROUND ART

Since a polyacetal resin is excellent in a balance of rigidity, strength, toughness, anti-creep life, fatigue resistance, chemical resistance and sliding properties, heat resistance, and the like and is easy to process, it is used as an engineering plastic in wide range of applications including electric parts, mechanical parts of electric parts, automobile parts, and other mechanical parts as representatives.

In particular, as characteristic applications of the polyacetal resin, it is used for sliding-related parts such as gears and cams in mechanical parts of electric and electronic devices. Parts in sliding-related applications, such as gears and cams, are frequently used in a state where a certain load is applied to the parts. As properties, to say nothing of sliding properties, not only short-term mechanical properties such as rigidity, strength, and toughness but also long-term properties such as anti-creep life and fatigue resistance are frequently required.

Recently, in these parts in sliding-related applications and the like, weight saving, miniaturization, and increase in durability of the parts have been required. As a result, there has been desired a polyacetal resin composition wherein not only short-term mechanical properties such as rigidity, strength, and toughness but also long-term properties such as anti-creep life and fatigue resistance are improved.

Thus, as common methods, as in the case of other engineering plastics such as polyamides, improvement of its performance has been attempted by blending an inorganic filler such as glass fibers, wollastonite, or carbon fibers. However, in the case that glass fibers or an inorganic filler is blended into the polyacetal resin, the blending is effective for improvement of mechanical properties such as rigidity and toughness but sliding properties originally characteristic of the polyacetal resin and long-term properties such as anti-creep life and fatigue resistance and further toughness are sometimes severely deteriorated, so that the method is not effective. Moreover, in the case of blending the glass fibers or an inorganic filler in a large amount, thermal stability of the polyacetal resin is sometimes lowered and thus there is a possibility that moldability, heat-resistant aging property, or the like may be adversely effected, so that the method becomes problematic in some cases.

There have been known polyacetal resin compositions comprising a polyacetal resin and calcium carbonate wherein a saturated fatty acid, an unsaturated fatty acid, or a metal salt thereof is used as an interfacial adhesion accelerator between the polyacetal resin and calcium carbonate (e.g., Patent Documents 1 to 3) and a polyacetal resin composition wherein a specific sulfate compound is used as an interfacial adhesion accelerator (e.g., Patent Document 4). The polyacetal resin compositions are known to be excellent in a balance of rigidity and toughness and also excellent in thermal stability and sliding properties. Furthermore, polyacetal resin compositions comprising a polyacetal resin, calcium carbonate, and a specific fatty acid ester are known to be particularly excellent in sliding properties (e.g., Patent Documents 5 and 6).

The above polyacetal resin compositions comprising a polyacetal resin and calcium carbonate have characteristics that they are excellent in a balance of rigidity and toughness and also excellent in sliding properties and thermal stability as compared with the cases that glass fibers or an inorganic filler is blended into the polyacetal resin. However, in the case of the use as actual structural parts, there is a case that higher rigidity and toughness are required. Moreover, with regard to the increase in durability of the structural parts, long-term properties such as anti-creep life and fatigue resistance are sometimes insufficient.

In addition to the above problems, there is a case that improvement of durability of the polyacetal resin against an acid, i.e., acid resistance, is required. The acid resistance herein means resistance to weight loss and deterioration in mechanical properties that a molded article of the polyacetal resin suffers from, when being placed under an acidic atmosphere, through corrosion of the molded article per se. As a specific example, a fuel-feeding unit in automobile parts may be mentioned. Hitherto, the polyacetal resin has been used in large-sized parts which come into direct contact with gasoline, such as fuel pump modules, because of the properties of excellent chemical resistance, especially gasoline fuel impermeability. For the purpose of contributing to prevention of recent global warming, there is a trend of actively popularizing diesel fuel vehicles which less emit carbon dioxide instead of gasoline fuel vehicles and it is attempted to use the polyacetal resin in fuel-feeding units for diesel fuel. However, since light oil to be used as diesel fuel contains a high level of sulfur, i.e., a high level of sulfur oxides as compared with gasoline fuel and the maximum temperature for use is higher than the case of gasoline fuel, there is a problem that parts which come into direct contact with the diesel fuel, e.g., pump modules, fuel valves, fuel tank flanges, fuel level gauges, and the like may be corroded and cannot exhibit a sufficient durability as the parts in the case of conventional polyacetal resins.

For the purpose of solving such a problem, there have been disclosed a composition wherein a hindered phenol-based compound, a specific phosphorus-based stabilizer, a specific nitrogen compound, and a specific metal hydroxide or alkoxy metal are blended into a polyacetal resin (Patent Document 7), a material wherein an alkaline additive is incorporated into a polyacetal resin base material (Patent Document 8), and a composition comprising a polyacetal resin and also zinc oxide and polyalkylene glycol (Patent Document 9). As a result, there is a tendency that acid resistance may be improved as compared with conventional polyacetal resins but a balance of rigidity and toughness tends to be disrupted owing to the addition of various additives, so that a design with a large thickness is required due to insufficiency of rigidity and toughness in the case of the use as large-sized parts such as fuel pumps. Moreover, there is a problem that the above materials lack reliability because of insufficient long-term properties such as anti-creep life.

As described above, in various applications, there has been desired a polyacetal composition which is excellent in a balance of thermal stability and mechanical properties, such as rigidity and toughness, and also excellent in anti-creep life, fatigue resistance and further acid resistance.

Patent Document 1: British Patent Application Publication No. 1123358
Patent Document 2: JP-A-1-170641,
Patent Document 3: JP-T-2004-506772,
Patent Document 4: U.S. Pat. No. 4,456,710,
Patent Document 5: JP-A-1-263145,
Patent Document 6: JP-A-5-51514,
Patent Document 7: Japanese Patent No. 3157579,
Patent Document 8: JP-A-11-302497,
Patent Document 9: JP-A-2001-11284,

DISCLOSURE OF THE INVENTION

Problems to be Solved by the Invention

An object of the present invention is to provide a polyacetal composition which is excellent in a balance of thermal stability and mechanical properties, such as rigidity and toughness, and also excellent in anti-creep life, fatigue resistance and further acid resistance.

Means for Solving the Problems

As a result of extensive studies for solving the above problems, the present inventors have found that a polyacetal resin composition comprising a polyacetal resin and calcium carbonate having a specific shape and an organic acid and also containing specific amounts of Na and Sr is excellent in a balance of thermal stability and mechanical properties, such as rigidity and toughness, and also is excellent in anti-creep life, fatigue resistance and acid resistance. Thus, they have accomplished the invention.

Namely, the invention is as follows:

(1) A polyacetal resin composition comprising:
   (I) a polyacetal resin; and per 100 parts by weight thereof,
   (II) more than 5 parts by weight but less than 100 parts by weight of calcium carbonate, wherein the calcium carbonate has an average particle diameter of from 0.1 µm to less than 1.5 µm and an average aspect ratio (L/D) which is a ratio of average major axis (L) of particles to average minor axis (D) of particles of 3 or less;
   (III) 0.005 to 10 parts by weight of an organic acid; and
   (IV) 0 to less than 0.05 parts by weight of a fatty acid ester,
   wherein the amount of Na relative to Ca is 250 ppm or less and the amount of Sr relative to Ca is from 500 to 2500 ppm;

(2) The polyacetal resin composition according to the above (1), wherein the amount of Na relative to Ca in the composition is 100 ppm or less;

(3) The polyacetal resin composition according to the above (1) or (2), wherein the amount of Sr relative to Ca in the composition is from 600 to 1500 ppm;

(4) The polyacetal resin composition according to any one of the above (1) to (3), wherein formaldehyde-generating rates, at the time when the polyacetal resin (I) is heated at 220° C. under an argon stream, for heating periods of from 2 minutes to 10 minutes, from 10 minutes to 30 minutes and from 50 minutes to 90 minutes are each 15 ppm/min or less;

(5) The polyacetal resin composition according to any one of the above (1) to (4), wherein the polyacetal resin (I) is a heat-stabilized polyacetal resin obtained by treating to stabilize thermally unstable terminals with at least one quaternary ammonium compound represented by the following formula:

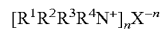

wherein $R^1$, $R^2$, $R^3$, $R^4$ each independently represents an unsubstituted or substituted alkyl group having 1 to 30 carbon atoms, an aryl group having 6 to 20 carbon atoms, an aralkyl group in which an unsubstituted or substituted alkyl group having 1 to 30 carbon atoms is substituted with at least one aryl group having 6 to 20 carbon atoms, or an alkylaryl group in which an aryl group having 6 to 20 carbon atoms is substituted with at least one unsubstituted or substituted alkyl group having 1 to 30 carbon atoms, provided that the unsubstituted or substituted alkyl group may be any of linear, branched or cyclic, and that in the unsubstituted alkyl group, aryl group, aralkyl group or alkylaryl group, hydrogen atom(s) may be substituted with halogen(s); n represents an integer of 1 to 3; and X represents a hydrogen atom, or an acid residue of a carboxylic acid having 1 to 20 carbon atoms, a hydroacid, an oxo acid, an inorganic thio acid or an organic thio acid having 1 to 20 carbon atoms;

(6) The polyacetal resin composition according to any one of the above (1) to (5), wherein the polyacetal resin (I) is a copolymer having a melting point of 164 to 172° C.;

(7) The polyacetal resin composition according to any one of the above (1) to (6), wherein the calcium carbonate (II) is light calcium carbonate;

(8) The polyacetal resin composition according to any one of the above (1) to (7), wherein the calcium carbonate (II) has an average particle diameter of from 0.1 µm to 1.0 µm;

(9) The polyacetal resin composition according to any one of the above (1) to (8), wherein the calcium carbonate (II) has a content of particles having a particle diameter of 1 µm or less of 90% or more;

(10) The polyacetal resin composition according to any one of the above (1) to (9), wherein the calcium carbonate (II) has a BET specific surface area of from 10 to 200 m²/g;

(11) The polyacetal resin composition according to any one of the above (1) to (10), wherein the calcium carbonate (II) comprises spherical particles, cubic particles, rectangular particles, amorphous particles, or a mixture thereof;

(12) The polyacetal resin composition according to any one of the above (1) to (11), wherein the organic acid (III) is a saturated fatty acid having 8 to 36 carbon atoms;

(13) The polyacetal resin composition according to any one of the above (1) to (12), wherein the fatty acid ester (IV) is an ester of a fatty acid having 10 to 24 carbon atoms with a monohydric or polyhydric alcohol having 2 to 22 carbon atoms;

(14) A polyacetal resin composition comprising the polyacetal resin composition according to any one of the above (1) to (13) and further (V) 0.1 to 10 parts by weight of a polyalkylene glycol per 100 parts by weight of the polyacetal resin composition;

(15) The polyacetal resin composition according to the above (14), wherein the polyalkylene glycol (V) is polyethylene glycol or polypropylene glycol;

(16) The polyacetal resin composition according to the above (14) or (15), wherein the polyalkylene glycol (V) has a number-average molecular weight of from 10,000 to 45,000;

(17) A process for producing a polyacetal resin composition comprising a step of simultaneously melt-kneading:
(I) a polyacetal resin; and per 100 parts by weight thereof,
(II) more than 5 parts by weight but less than 100 parts by weight of calcium carbonate which has an average particle diameter of from 0.1 μm to less than 1.5 μm and an average aspect ratio (L/D) which is a ratio of average major axis (L) of particles to average minor axis (D) of particles of 3 or less and which is not surface-treated with a saturated fatty acid, unsaturated fatty acid and a metal salt thereof having 8 to 32 carbon atoms; and
(III) 0.005 to 10 parts by weight of an organic acid,
at melting point of the polyacetal resin (I) or higher;
(18) The process according to the above (17), wherein formaldehyde-generating rates, at the time when the polyacetal resin (I) is heated at 220° C. under an argon stream, for heating periods of from 2 minutes to 10 minutes, from 10 minutes to 30 minutes and from 50 minutes to 90 minutes are each 15 ppm/min or less;
(19) The process according to the above (17) or (18), wherein the polyacetal resin (I) is a heat-stabilized polyacetal resin obtained by treating to stabilize thermally unstable terminals with at least one quaternary ammonium compound represented by the following formula:

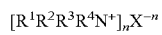

wherein $R^1$, $R^2$, $R^3$, $R^4$ each independently represents an unsubstituted or substituted alkyl group having 1 to 30 carbon atoms, an aryl group having 6 to 20 carbon atoms, an aralkyl group in which an unsubstituted or substituted alkyl group having 1 to 30 carbon atoms is substituted with at least one aryl group having 6 to 20 carbon atoms, or an alkylaryl group in which an aryl group having 6 to 20 carbon atoms is substituted with at least one unsubstituted or substituted alkyl group having 1 to 30 carbon atoms, provided that the unsubstituted or substituted alkyl group may be any of linear, branched or cyclic, and that in the unsubstituted alkyl group, aryl group, aralkyl group or alkylaryl group, hydrogen atom(s) may be substituted with halogen(s); n represents an integer of 1 to 3; and X represents a hydrogen atom, or an acid residue of a carboxylic acid having 1 to 20 carbon atoms, a hydroacid, an oxo acid, an inorganic thio acid or an organic thio acid having 1 to 20 carbon atoms;
(20) The process according to any one of the above (17) to (19), wherein the polyacetal resin (I) is a copolymer having a melting point of 164 to 172° C.;
(21) The process according to any one of the above (17) to (20), wherein in the calcium carbonate (II), the amount of Na relative to Ca is 250 ppm or less and the amount of Sr relative to Ca is from 500 to 2500 ppm;
(22) The process according to any one of the above (17) to (21), wherein the calcium carbonate (II) is light calcium carbonate;
(23) The process according to any one of the above (17) to (22), wherein the calcium carbonate (II) has an average particle diameter of is from 0.1 μm to 1.0 μm;
(24) The process according to any one of the above (17) to (23), wherein the calcium carbonate (II) has a content of particles having a particle diameter of 1 μm or less of 90% or more;
(25) The process according to any one of the above (17) to (24), wherein the calcium carbonate (II) has a BET specific surface area of from 10 to 200 m²/g;
(26) The process according to any one of the above (17) to (25) wherein the calcium carbonate (II) comprises spherical particles, cubic particles, rectangular particles, amorphous particles, or a mixture thereof;
(27) The process according to any one of the above (17) to (26), wherein the organic acid (III) is a saturated fatty acid having 8 to 36 carbon atoms.

ADVANTAGES OF THE INVENTION

The polyacetal resin composition of the invention exhibits advantages that it is excellent in a balance of thermal stability and mechanical properties, such as rigidity and toughness, and also excellent in anti-creep life, fatigue resistance and acid resistance.

BEST MODE FOR CARRYING OUT THE INVENTION

The following will explain the present invention specifically.
The polyacetal resin (I) for use in the invention is a known polyacetal resin and is not particularly limited. Examples thereof include a polyacetal homopolymer substantially solely consisting of oxymethylene units obtained by homopolymerization of formaldehyde monomer or a cyclic oligomer of formaldehyde, such as trimer (trioxane) or tetramer (tetraoxane) thereof, and a polyacetal copolymer obtained by copolymerization of formaldehyde monomer or a cyclic oligomer of formaldehyde, such as trimer (trioxane) or tetramer (tetraoxane) thereof, with a cyclic ether or a cyclic formal, such as ethylene oxide, propylene oxide, epichlorohydrin, 1,3-dioxolane, or a cyclic formal of a glycol or diglycol including 1,4-butandiol formal. Among the polyacetal copolymers, in view of an excellent balance of rigidity, toughness, and heat resistance, preferred amount of a comonomer such as 1,3-dioxolane to be added is from 0.1 to 60 mol %, more preferably from 0.1 to 20 mol %, most preferably from 0.15 to 10 mol % relative to 1 mol of trioxane. At this time, the melting point of the polyacetal resin depends on the amount of the comonomer and is preferably from 164° C. to 172° C., more preferably from 165° C. to 171° C., most preferably from 167° C. to 170° C.

Moreover, as a polyacetal copolymer, use can be also made of a branched polyacetal copolymer having branching obtained by copolymerization of a monofunctional glycidyl ether or a crosslinked polyacetal copolymer having a crosslinked structure obtained by copolymerization of a polyfunctional glycidyl ether. Furthermore, use can be also made of a compound having a functional group such as hydroxyl group at both terminals or one terminal, e.g., a block polyacetal homopolymer obtained by polymerization of formaldehyde monomer or a cyclic oligomer of formaldehyde in the presence of a polyalkylene glycol or a compound having a functional group such as hydroxyl group at both terminals or one terminal, e.g., a block polyacetal copolymer having block components obtained by copolymerization of formaldehyde monomer or a cyclic oligomer of formaldehyde, such as trimer (trioxane) or tetramer (tetraoxane) thereof, with a cyclic ether or a cyclic formal in the presence of hydrogenated polybutadiene glycol. In the invention, the above polyacetal resin may be used singly or as a mixture of two or more thereof.

Among the above polyacetal resins, in view of an excellent balance of rigidity, toughness, and thermal stability, as the polyacetal resin (I), a random-type polyacetal copolymer wherein the comonomer components are randomly combined, a block-type polyacetal copolymer, a branched type polyacetal copolymer, or a crosslinked polyacetal copolymer and a mixture thereof are preferred. Moreover, in view of cost, a random-type polyacetal copolymer or block-type polyacetal copolymer is more preferred.

Furthermore, in view of thermal stability, as the polyacetal resin (I), when it is heated at 220° C. under an argon stream, formaldehyde-generating rates for heating periods of from 2 minutes to 10 minutes, from 10 minutes to 30 minutes, and from 50 minutes to 90 minutes are each preferably 15 ppm/min. or less, more preferably 10 ppm/min. or less, most preferably 5 ppm/min. or less. The following specifically describes the measurement of the above formaldehyde-generating rate. Under a nitrogen stream (50 NL/hr), the polyacetal resin is heated to melt at 220° C., formaldehyde generated is absorbed in water, and then is titrated by a sodium sulfite method. At that time, when the amount (ppm) of formaldehyde generated from the start of heating until 2 minutes has passed is taken as $Y_2$, the amount until 10 minutes has passed as $Y_{10}$, the amount until 30 minutes has passed as $Y_{30}$, the amount until 50 minutes has passed as $Y_{50}$, and the amount until 90 minutes has passed as $Y_{90}$, the rates are calculated as follows:

Generating rate from 2 minutes to 10 minutes: $(Y_{10}-Y_2)/8$ (ppm/min.),

Generating rate from 10 minutes to 30 minutes: $(Y_{30}-Y_{10})/20$ (ppm/min.), and Generating rate from 50 minutes to 90 minutes: $(Y_{90}-Y_{50})/40$ (ppm/min). These values are derived from the formaldehyde attached to the polyacetal resin, derived from the formaldehyde generated by decomposition of terminals of the polyacetal resin, and derived from the formaldehyde generated by decomposition of main chain of the polyacetal resin, respectively. The smaller these values are, the more excellent the thermal stability is.

Melt flow index MFI of the above polyacetal resin (I) (measured according to ASTM-D1238) is not particularly limited but is preferably from 0.1 g/10 minutes to 150 g/10 minutes, more preferably from 0.5 g/10 minutes to 130 g/10 minutes, most preferably 1 g/10 minutes to 100 g/10 minutes in view of processability.

In the invention, the process for producing the polyacetal resin (I) may be a known process for producing a polyacetal resin and is not particularly limited. For example, in the case of the above polyacetal homopolymer, there may be mentioned a process wherein highly pure formaldehyde is introduced into an organic solvent containing an organic amine, an organic or inorganic tin compound, a basic polymerization catalyst such as a metal hydroxide to polymerize and, after filtration of the polymer, it is heated in acetic anhydride in the presence of sodium acetate to acetylate the polymer terminals. Moreover, in the case of the above polyacetal copolymer, there may be mentioned a production process wherein highly pure trioxane and copolymerization component(s) such as ethylene oxide and/or 1,3-dioxolane, and a chain transfer agent for molecular weight control are introduced into an organic solvent such as cyclohexane, cationic polymerization is conducted using a polymerization catalyst such as a Lewis acid like boron trifluoride diethyl ether complex, and then deactivation of the catalyst and stabilization of terminal groups are effected or a production process wherein bulk polymerization is conducted by introducing trioxane, copolymerization component(s), a chain transfer agent for molecular weight control, and a catalyst into a self cleaning-type extrusion kneader such as a co-kneader, a twin-screw continuous extrusion kneader, or a twin paddle-type continuous mixer and then a quaternary ammonium compound such as choline hydroxide formate is further added to remove unstable terminals by decomposition.

As a method of obtaining a preferred polyacetal resin (I) excellent in thermal stability, there may be mentioned a method of stabilizing a polyacetal resin by treating thermally unstable terminals with at least one quaternary ammonium compound represented by the following formula:

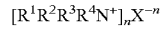

$$[R^1R^2R^3R^4N^+]_n X^{-n}$$

wherein $R^1$, $R^2$, $R^3$, $R^4$ each independently represents an unsubstituted or substituted alkyl group having 1 to 30 carbon atoms, an aryl group having 6 to 20 carbon atoms, an aralkyl group in which an unsubstituted or substituted alkyl group having 1 to 30 carbon atoms is substituted with at least one aryl group having 6 to 20 carbon atoms, or an alkylaryl group which an aryl group having 6 to 20 carbon atoms is substituted with at least one unsubstituted or substituted alkyl group having 1 to 30 carbon atoms, provided that the unsubstituted or substituted alkyl group may be any of linear, branched, or cyclic, and that in the unsubstituted alkyl group, aryl group, aralkyl group or alkylaryl group, hydrogen atom(s) may be substituted with halogen(s); n represents an integer of 1 to 3; and X represents a hydrogen atom, or an acid residue of a carboxylic acid having 1 to 20 carbon atoms, a hydroacid, an oxo acid, an inorganic thio acid or an organic thio acid having 1 to 20 carbon atoms.

In the above general formula, preferred $R^1$, $R^2$, $R^3$, and $R^4$ are independently an alkyl group having 1 to 5 carbon atoms or a hydroxyalkyl group having 2 to 4 carbon atoms, and furthermore it is more preferable that at least one of $R^1$, $R^2$, $R^3$, and $R^4$ is a hydroxyethyl group. Specific examples of $R^1$, $R^2$, $R^3$, and $R^4$ include hydroxides of tetramethylammonium, tetraethylammonium, tetrapropylammonium, tetra-n-butylammonium, cetyltrimethylammonium, tetradecyltrimethylammonium, 1,6-hexamethylene-bis(trimethylammonium), decamethylene-bis(trimethylammonium), trimethyl-3-chloro-2-hydroxypropylammonium, trimethyl(2-hydroxyethyl)ammonium, triethyl(2-hydroxyethyl)ammonium, tripropyl(2-hydroxyethyl)ammonium, tri-n-butyl(2-hydroxyethyl)ammonium, trimethylbenzylammonium, triethylbenzylammonium, tripropylbenzylammonium, tri-n-butylbenzylammonium, trimethylphenylammonium, triethylphenylammonium, trimethyl-2-oxyethylammonium, monomethyltrihydroxyethylammonium, monoethyltrihydroxyethylammonium, octadecyl(2-hydroxyethyl)ammonium, tetrakis(hydroxyethyl)ammonium, etc.; salts of hydroacids such as hydrochloric acid, hydrobromic acid, hydrofluoric acid, etc.; salts of oxo acids such as sulfuric acid, nitric acid, phosphoric acid, carbonic acid, boric acid, chloric acid, iodic acid, silicic acid, perchloric acid, chlorous acid, hypochlorous acid, chlorosulfuric acid, amidosulfuric acid, disulfuric acid, tripolyphosphoric acid, etc.; salts of thio acids such as thiosulfuric acid; salts of carboxylic acids such as formic acid, acetic acid, propionic acid, butanoic acid, isobutyric acid, pentanoic acid, capronic acid, caprylic acid, capric acid, benzoic acid, oxalic acid, etc.; or the like. Among them, hydroxides and salts of sulfuric acid, carbonic acid, boric acid, and carboxylic acids are preferred. Among carboxylic acids, formic acid, acetic acid, and propionic acid are particularly preferred. These quaternary ammonium compounds can be used alone or in combination of two or more thereof.

An amount of the quaternary ammonium compound to be added is from 0.05 to 50 ppm by weight, preferably from 1 to 30 ppm by weight in terms of the amount of nitrogen originating from the quaternary ammonium compound represented by the following formula on the basis of total weight of the polyacetal resin and the quaternary ammonium compound.

$$P \times 14/Q$$

wherein P represents a concentration of the quaternary ammonium compound relative to the polyacetal resin (ppm by weight); "14" is the atomic weight of nitrogen; and Q represents the molecular weight of quaternary ammonium compound.

When the amount of the quaternary ammonium compound added is less than 0.05 ppm by weight, the decomposition rate of the unstable terminal groups tends to be lowered and when it exceeds 50 ppm by weight, color tone of the polyacetal resin resulting from the decomposition of the unstable terminal groups tends to be deteriorated.

As a method of the above stabilization, the above quaternary ammonium compound and the polyacetal resin is preferably subjected to heat treatment at a resin temperature of from the melting point of the polyacetal resin to 260° C. using an extruder, a kneader, or the like. Above 260° C., there will be a coloring problem and a problem of decomposition of polymer main chain (formation of low molecular weight polymers). Moreover, a method of adding the quaternary ammonium compound is not particularly limited. That is, a method of adding it as an aqueous solution in the step of deactivating the polymerization catalyst, a method of spraying it onto the resin powder, and the like are available. Any of these methods can be used, so long as the quaternary ammonium compound is present in the step of heat treatment of the polyacetal resin. The compound may be injected into an extruder or the compound is attached to resin pellets and the decomposition of the unstable terminals may be carried out in the successive blending step. The decomposition of the unstable terminals can be carried out after the polymerization catalyst in the polyacetal resin obtained by polymerization is deactivated or can be carried out without deactivating the polymerization catalyst.

The calcium carbonate (II) for use in the invention is not particularly limited so long as the average particle diameter is from 0.1 µm to less than 1.5 µm and the average aspect ratio (L/D) which is a ratio of average major axis (L) of the particle to average minor axis (D) of the particle is 3 or less. For example, the crystalline form of the calcium carbonate may be any of calcite, aragonite, and vaterite, which are generally known. Moreover, in view of the production method and kind, the calcium carbonate may be naturally occurring heavy calcium carbonate or light calcium carbonate (sometimes referred to as colloidal calcium carbonate, precipitated calcium carbonate, active calcium carbonate, or the like). They may be used singly or as a mixture of two or more thereof so long as their properties fall within the above range.

With regard to the calcium carbonate (II) for use in the invention, from the viewpoints that it has appropriate wettability, compatibility, and adhesiveness with the polyacetal resin and is excellent in dispersibility and a balance of mechanical properties and anti-creep life and fatigue resistance of the resulting polyacetal resin are excellent, light calcium carbonate may be mentioned as preferred calcium carbonate and also calcite is preferred as the crystalline form. On this occasion, the shape of the calcium carbonate is spherical one, cubic one, rectangular one, spindle-shaped one, amorphous one, or the like but preferred shape is spherical one, cubic one, rectangular one, amorphous one, or a mixture thereof. Moreover, the average particle diameter of the calcium carbonate is preferably from 0.1 to 1.0 µm, more preferably from 0.1 to 0.6 µm, most preferably from 0.10 to 0.40 µm. Furthermore, the average aspect ratio (L/D) which is a ratio of average major axis (L) of the particle to average minor axis (D) of the particle is preferably 3 or less, more preferably 2 or less, most preferably 1.5 or less. In the invention, in the shape of the particles of calcium carbonate, the shortest distance between two parallel lines tangent to outline in a plane view of the particle is referred to as minor axis and the largest distance between parallel lines perpendicular to the above parallel lines is referred to as major axis using the definition of Heywood. Moreover, the average particle diameter, average major axis, average minor axis, and average aspect ratio are used with defining as:

Average particle diameter=average major axis=$\Sigma L_i^2 N_i / \Sigma L_i N_i$ Average minor axis=$\Sigma d_i^2 N_i / \Sigma d_i N_i$ Average aspect ratio $L/d = (\Sigma L_i^2 N_i / \Sigma L_i N_i)/(\Sigma d_i^2 N_i / \Sigma d_i N_i)$ when Ni particles of calcium carbonate having a major axis of $L_i$ and a minor axis of $d_i$ are present in a unit volume. More specifically, calcium carbonate to be investigated using a scanning electron microscope (SEM) is sampled, particle image is photographed with a magnification of 1000 to 50000 using it, and each length of at least 100 particles of calcium carbonate randomly selected is measured and determined.

For the same reason, with regard to the average particle diameter of preferred calcium carbonate, the content of particles having a particle diameter of 1 µm or less is 90% or more, more preferably 95% or more, and most preferably 98% or more. The method of measuring the average particle diameter is obtained by a light-transmission particle size analyzing method.

For the same reason, the specific surface area of the calcium carbonate (II) is preferably from 10 to 200 m$^2$/g, more preferably from 10 to 100 m$^2$/g, most preferably from 10 to 50 m$^2$/g in accordance with a BET adsorption method. The BET method herein is effected according to a nitrogen gas adsorption method.

In the polyacetal resin composition of the invention, the amount of Na and the amount of Sr relative to Ca are 250 ppm or less and from 500 to 2500 ppm, respectively. These Na and Sr are derived from impurities contained in the calcium carbonate (II). In general, with regard to calcium carbonate, a method of pulverizing and purifying naturally occurring heavy calcium carbonate, a method of artificial synthesis of introducing carbon dioxide gas into an aqueous calcium hydroxide solution, purification, and optional addition of an aggregation inhibitor and/or a surface-treating agent, and the like have been known. In any of the steps, Na contained in water or the like and Sr replaceable with Ca may be sometimes incorporated as impurities in calcium carbonate. Moreover, they may be sometimes contained in limestone or the like used as a raw material of calcium carbonate. When the content of Na and Sr relative to Ca in the invention falls within the above range, the resulting polyacetal resin composition is excellent in a balance of thermal stability and mechanical properties, such as rigidity and toughness, also excellent in anti-creep life and fatigue resistance. The reasons thereof are not clear but it is presumed that an effect of decreasing particle diameter of calcium carbonate and sharpening particle size distribution is present and also wettability and interface with the polyacetal resin are improved. For the above reasons, the amount of Na relative to Ca in the calcium carbonate (II) is preferably 250 ppm or less, more preferably 200 ppm or less, even preferably 150 ppm or less, most preferably 100 ppm or less. Similarly, the amount of Sr relative to Ca is preferably from 500 to 2500 ppm, more preferably from 600 to 1500 ppm, even more preferably from 700 to 1300 ppm, most preferably from 800 to 1000 ppm. The above amounts of Na and Sr relative to Ca can be determined by a high-frequency inductively-coupled plasma (IPC) emission spectrometry. More specifically, 0.5 g of calcium carbonate is weighed in a platinum dish and carbonized in an electric furnace at 500° C. After cooling, 5 mL of hydrochloric acid and 5 mL of pure water are added thereto and the whole is boiled to dissolve on a heater. After cooling, pure water is added to adjust the concentration to a measurable level and quantitative determination is carried out by a high-frequency inductively-coupled plasma (IPC) emission spectrometry using IRIS/IP manufactured by Thermo Jarrell Ash based on a characteristic wavelength of each metal. Thereafter, the amounts of Na and Sr relative to Ca are calculated.

With regard to the calcium carbonate (II) for use in the invention, for the purpose of preventing aggregation of particles, a known surface-treating agent, a deposition agent, or a completing agent, and further an aggregation inhibitor may be added thereto in a step of separating calcium carbonate from a calcium carbonate slurry in the process for producing calcium carbonate, particularly in the process for producing light calcium carbonate and, as a result, the surface thereof may be treated with the substance. As the surface-treating agent, a deposition agent, or a complexing agent, and an aggregation inhibitor, use can be made of anionic surfactants, cationic surfactants, amphoteric surfactants, nonionic surfactants, as described in, e.g., "Bunsan/Gyoushu no Kaimei to Ohyo Gijutsu, 1992" (supervised by Fumio Kitahara, published by K.K. Techno System), pp. 232 to 237. In addition, there may be mentioned silane-coupling agents such as aminosilanes and epoxysilanes, titanate-based coupling agents, and also fatty acids (saturated fatty acids, unsaturated fatty acids), alicyclic carboxylic acids, as well as resin acids and metal soaps.

In the polyacetal resin composition of the invention, from the viewpoints that it is more excellent in a balance of mechanical properties, such as rigidity and toughness, and is excellent in anti-creep life, the calcium carbonate (II) contains the above surface-treating agent, deposition agent, or complexing agent, and further aggregation inhibitor in an amount of preferably less than 3.0% by weight, more preferably less than 1.0% by weight, even more preferably less than 0.5% by weight, and they are most preferably substantially not added. Among them, the calcium carbonate which is not treated with a saturated fatty acid or unsaturated fatty acid having 8 to 32 carbon atoms and a metal salt thereof exhibits an effect of excellent anti-creep life and hence is particularly preferred.

The quantitative determination of the above surface-treating agent, deposition agent, or complexing agent, and further aggregation inhibitor can be confirmed by a thermogravimetry (TGA). Specifically, the calcium carbonate is loaded on a themogravimeter (TGA), heated to 100° C. at a rate of 100° C./minute, subjected to heat treatment at that temperature for 10 minutes to remove moisture of the calcium carbonate, and then heated to 550° C. at a rate of 100° C./minute and subjected to heat treatment at that temperature for 60 minutes. Thereafter, it can be determined according to the expression: the amount of the above organic component=[(weight after completion of heat treatment at 100° C. for 10 minutes)-(weight after completion of heat treatment at 550° C. for 60 minutes)]/(weight after completion of heat treatment at 100° C. for 10 minutes)×100 (%).

The addition of the above surface-treating agent and the like to the inorganic filler generally tends to improve dispersibility into the resin and realize excellent mechanical properties, and hence is considered preferable. However, with regard to the fine calcium carbonate for use in the invention, in the production steps of the fine calcium carbonate, the addition of the above surface-treating agent and the like in an amount more than necessary amount tends to result in increase in bulk density of the particle, flying in the air at handling, or contrary tight aggregation of the particles. Therefore, there sometimes arise problems that working environment becomes worse at the production of the polyacetal resin composition, operations take much time and labor, and the like. Furthermore, at the production of the polyacetal resin composition using melt-kneading, quantitative feeding to a melt kneader becomes difficult and thus there sometimes arises a problem from the viewpoint of quality of the resulting polyacetal resin composition. According to the invention, such problems are solved and preferred dispersion of calcium carbonate into the polyacetal resin composition can be achieved without substantial use of the above surface-treating agent and the like. In addition, the interface has an appropriate wettability and adhesiveness and the resulting polyacetal resin composition is excellent in a balance of mechanical properties, such as rigidity and toughness, and further particularly excellent in anti-creep life.

The organic acid (III) for use in the invention means a monobasic or polybasic carboxylic acid having an aliphatic group or an aromatic group and one wherein a substituent such as a hydroxyl group is introduced into part of them, or an acid anhydride of these acids, a monobasic or polybasic sulfonic acid having an aliphatic group or an aromatic group and one wherein a substituent such as a hydroxyl group is introduced into part of them, or further, a monobasic or polybasic phosphoric acid having an aliphatic group or an aromatic group and one wherein a substituent such as a hydroxyl group is introduced into part of them, and is not particularly limited so long as it is known. For example, there may be mentioned acetic acid, propionic acid, butyric acid, valeric acid, caproic acid, caprylic acid, lauric acid, tridecylic acid, myristic acid, palmitic acid, heptadecylic acid, stearic acid, pivalic acid, isobutyric acid, and ethylenediaminetetraacetic acid as saturated fatty acids; oleic acid, elaidic acid, erucic acid, linoleic acid, ricinoleic acid, and the like as unsaturated fatty acids; naphthenic acid and the like as alicyclic carboxylic acids; abietic acid, pimaric acid, palustric acid, neoabietic acid, and the like as resin acids; furthermore, acid anhydrides thereof; laurylsulfonic acid, polyoxyethylenelauryl-ether-sulfonic acid, dodecylbenzenesulfonic acid, dialkylsulfosuccinic acids, and the like as monobasic or polybasic sulfonic acids. They may be used singly or as a mixture of two or more thereof.

Among them, in view of thermal stability and color tone, saturated fatty acids, unsaturated fatty acids, alicyclic carboxylic acids, and resin acids, which are monobasic or polybasic carboxylic acids, can be preferably mentioned. Moreover, in view of dispersibility into the polyacetal resin and more excellent color tone, saturated fatty acids are preferred. Furthermore, with regard to the resulting polyacetal resin composition, in view of bleeding of the carboxylic acid onto the surface of molded articles or contamination of organic substances attached to the mold, saturated fatty acids having 8 to 36, more preferably 10 to 30, most preferably 12 to 24 carbon atoms are preferred. For example, there may be mentioned lauric acid, tridecylic acid, myristic acid, pentadecylic acid, palmitic acid, heptadecylic acid, stearic acid, nonadecanoic acid, alginic acid, behenic acid, lignoceric acid, cerotic acid, heptacosanoic acid, montanic acid, linoleic acid, alginic acid, and the like.

The fatty acid ester (IV) for use in the invention is a known fatty acid ester obtained by polycondensation of a monohydric or polyhydric alcohol with a fatty acid and is not particularly limited. Examples of the monohydric or polyhydric alcohol include octyl alcohol, capryl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, oleyl alcohol, nonadecyl alcohol, eicosyl alcohol, behenyl alcohol, ceryl alcohol, melissyl alcohol, 2-hexyldecanol, 2-octyldodecanol, 2-decyltetradecanol, unilin alcohol, ethylene glycol, diethylene glycol, triethylene glycol, propylene glycol dipropylene glycol, butanediol, pentanediol, hexanediol, glycerin, diglycerin, triglycerin, threitol, erythritol, pentaerythritol, arabitol, ribitol, xylitol, sorbit, sorbitan, sorbitol, and mannitol. As the fatty acid, a saturated fatty acid or an unsaturated fatty acid may be mentioned. Specifically, there may be mentioned capric acid, lauric acid, myristic acid, palmitic acid stearic acid, 12-hydroxystearic acid, alginic acid, behenic acid, lignoceric acid, cerotic acid, montanic acid, melissic acid, ceroplastic acid, undecylenic acid, oleic acid, elaidic acid, cetoleic acid, erucic acid, brassdic acid, sorbic acid linoleic acid, linolenic acid, arachidonic acid, propiolic acid, stearolic acid, and the like. More specifically, there may be mentioned glycerin monopalmitate, glycerin dipalmitate, glycerin tripalmitate, glycerin monostearate, glycerin distearate, glycerin tristearate, glycerin monobehenate, glycerin dibehenate, glycerin tribehenate, glycerin monomontanate, glycerin dimontanate, glycerin trimontanate, pentaerythritol monopalmitate, pentaerythritol dipalmitate, pentaerythritol tripalmitate, pentaerythritol tetrapalmitate, pentaerythritol monostearate, pentaerythritol distearate, pentaerythritol tristearate, pentaerythritol tetrastearate, pentaerythritol monobehenate, pentaerythritol dibehenate, pentaerythritol tribehenate, pentaerythritol tetrabehenate, pentaerythritol monomontanate, pentaerythritol dimontanate, pentaerythritol trimontanate, pentaerythritol tetramontanate, sorbitan monopalmitate, sorbitan dipalmitate, sorbitan tripalmitate, sorbitan monostearate, sorbitan distearate, sorbitan tristearate, sorbitan monobehenate, sorbitan dibehenate, sorbitan tribehenate, sorbitan monomontanate, sorbitan dimontanate, sorbitan trimontanate, sorbitol monopalmitate, sorbitol dipalmitate, sorbitol tripalmitate, sorbitol monostearate, sorbitol distearate, sorbitol tristearate, sorbitol monobehenate, sorbitol dibehenate, sorbitol tribehenate, sorbitol monomontanate, sorbitol dimontanate, sorbitol trimontanate, and the like. They may be used singly or as a mixture of two or more thereof.

In view of mechanical properties, releasing properties, sliding properties, bleeding of the carboxylic acid onto the surface of molded articles, or contamination of organic substances attached to the mold, there may be mentioned, as preferred fatty acid esters, fatty acid esters of alcohols having 2 to 22, more preferably 2 to 20, most preferably 2 to 18 carbon atoms as monohydric or polyhydric alcohols with saturated fatty acids or unsaturated fatty acids having 8 to 32, more preferably 10 to 24, most preferably 12 to 22 carbon atoms as fatty acids. Specifically, there may be mentioned stearyl stearate, behenyl behenate, ethylene glycol distearate, propylene glycol monostearate, propylene glycol monobehenate, glycerin monostearate, glycerin monobehenate, sorbitan monostearate, sorbitan distearate, sorbitan monobehenate, and the like.

The polyacetal resin composition of the invention is a polyacetal resin composition comprising a polyacetal resin (I) and, per 100 parts by weight thereof, more than 5 parts by weight but less than 100 parts by weight of calcium carbonate (II) having an average particle diameter of 0.1 to less than 1.5 μm and an average aspect ratio (L/D) of 3 or less, 0.005 to 10 parts by weight of an organic acid (III), and 0 to less than 0.05 part by weight of a fatty acid ester (IV), wherein the amount of Na relative to Ca is 250 ppm or less while the amount of Sr relative to Ca is 500 to 2500 ppm. In view of obtaining a polyacetal resin composition more excellent in a balance of rigidity and toughness and excellent in anti-creep life and fatigue resistance, in the composition, the amount of Na relative to Ca is preferably 200 ppm or less, more preferably 150 ppm or less, most preferably 100 ppm or less. Similarly, the amount of Sr relative to Ca is preferably from 600 to 1500 ppm, more preferably from 700 to 1300 ppm, most preferably from 800 to 1000 ppm. At this time, the amounts of Na and Sr relative to Ca in the composition can be determined by a high-frequency inductively-coupled plasma (IPC) emission spectrometry. More specifically, 0.5 g of the polyacetal resin composition is weighed in a platinum dish and carbonized in an electric furnace at 500° C. After cooling, 5 mL of hydrochloric acid and 5 mL of pure water are added thereto and the whole is boiled to dissolve on a heater. After cooling, pure water is added to adjust the concentration to a measurable level and quantitative determination is carried out by a high-frequency inductively-coupled plasma (IPC) emission spectrometry using IRIS/IP manufactured by Thermo Jarrell 10 Ash based on a characteristic wavelength of each metal. Thereafter, the amounts of Na and Sr relative to Ca are calculated.

Moreover, in the polyacetal resin composition of the invention, in view of excellent thermal stability and moldability, formaldehyde-generating rates, when the polyacetal resin (I) is heated at 220° C. under an argon stream, for heating periods of from 2 minutes to 10 minutes, from 10 minutes to 30 minutes, and from 50 minutes to 90 minutes are each preferably 30 ppm/min. or less, more preferably 25 ppm/min. or less, most preferably 15 ppm/min. or less.

From the viewpoint that the polyacetal resin composition is more excellent in a balance of rigidity and toughness and excellent in anti-creep life and fatigue resistance, the amount of the calcium carbonate (II) to be added is preferably more than 10 parts by weight but less than 80 parts by weight, more preferably more than 15 parts by weight but less than 60 parts by weight, most preferably more than 20 parts by weight but less than 50 parts by weight per 100 parts by weight of the polyacetal resin (I). For the same reason, the amount of the organic acid (III) to be added is preferably from 0.01 to 8 parts by weight, more preferably from 0.015 to 5 parts by weight, most preferably from 0.02 to 4 parts by weight per 100 parts by weight of the polyacetal resin (I). Moreover, in view of excellent balance of rigidity and toughness, sliding properties and further stability of a plasticization step at molding, the amount of the fatty acid ester (IV) to be added is preferably from 0 to 0.04 parts by weight, more preferably from 0 to 0.03 parts by weight, most preferably from 0 to 0.02 parts by weight per 100 parts by weight of the polyacetal resin (I).

In the invention, from the viewpoint that the resulting polyacetal resin composition has more excellent balance of rigidity and toughness and further is excellent in anti-creep life and fatigue resistance, the calcium carbonate (II) in the polyacetal resin composition is dispersed so that the maximum aggregated particle diameter is preferably 10 μm or less, more preferably 5 μm or less, most preferably 3 μm or less, still most preferably 1 μm or less. Furthermore, ideally, the calcium carbonate is monodispersed in the state of an average particle diameter equal to the average particle diameter of the carbonate. The maximum aggregated particle diameter here means maximum size of the particles formed by secondary aggregation of the calcium carbonate (II) in the polyacetal resin composition. The maximum aggregated particle diameter is represented by a maximum value of the values obtained by forming a TYPE I test piece of ASTM D638 from pellets of the resin composition, cutting a thin piece out of a face perpendicular to the resin flown direction at the central part of the test piece by means of a microtome, and observing the thin piece on a transmission electron microscope (TEM) (e.g., selected from the range of a photographic magnification of 10,000 to 50,000 depending on the degree of aggregation).

The process for producing the polyacetal resin composition of the invention includes a method of dissolving the polyacetal resin (I) in a solvent, subsequently adding and mixing the calcium carbonate (II), organic acid (III), and fatty acid ester (IV), and removing the solvent, a method of adding and mixing the calcium carbonate (II), organic acid (III), and fatty acid ester (IV) to a heat-melt product of the polyacetal resin (I), a method of adding the calcium carbonate (II), organic acid (III), and fatty acid ester (IV) formed beforehand as a masterbatch, or a method of combination thereof, and is not particularly limited. Furthermore, the order of mixing the polyacetal resin (I), calcium carbonate (II), organic acid (III), and fatty acid ester (IV) is not particularly limited and, for example, a method of mixing all or part of the calcium carbonate (II), organic acid (III), and fatty acid ester (IV) in a cone-type blender or the like and subsequently adding the resulting mixture to a heat-melt product of the polyacetal resin (I) may be applied. Moreover, the calcium carbonate (II) and the organic acid (III) may be stirred and mixed using a Henschel mixer or the like at a temperature equal to or higher than the melting point of the organic acid (III), and the surface of the calcium carbonate (II) may be coated therewith.

Among them, in view of excellent productivity, as a preferred production method, there may be mentioned a method of adding and mixing the calcium carbonate (II), organic acid (III), and fatty acid ester (IV) to a heat-melt product of the polyacetal resin (I), i.e., a melt-kneading method.

In the case of production by the above melt-kneading method, as an apparatus therefor, a kneader commonly practically used can be applied. For example, a single-screw or multi-screw kneading extruder, a roll, or a Bumbury mixer, or the like may be employed. Of these, a twin-screw extruder equipped with a pressure-reducing apparatus and a side-feeder equipment is most preferred. As the melt-kneading method, there may be mentioned a method of kneading all the components simultaneously, a kneading method using a blend pre-kneaded beforehand, a method of feeding individual components sequentially at the midstream of the extruder and kneading them, or the like method. Moreover, it is possible to disperse the calcium carbonate (II) and the like in a solvent beforehand, which can be added in the slurry state. In that case, it can be also fed using a liquid-feeding pump.

The conditions for the melt kneading are not particularly limited but the degree of reduced pressure is preferably from 0 to 0.07 MPa. The temperature for kneading is preferably a temperature that is higher, by from 1 to 100° C., than the melting point or softening point determined by differential scanning calorimetry (DSC) in accordance with JIS K7121. More specifically, the temperature is from 160° C. to 240° C. The shear rate in the kneader is preferably 100 (SEC$^{-1}$) or more and the average residence time at kneading is preferably from 1 to 15 minutes. The solvent in the resin composition is preferably 1% by weight or less. When the conditions fall within the above ranges, productivity is excellent and color change of the resulting polyacetal resin composition tends to be suppressed.

In the above melt-kneading method, in view of obtaining more excellent in a balance of mechanical properties, such as rigidity and toughness, and particularly excellent in anti-creep life, as an even more preferred production method, there may be mentioned a process for producing a polyacetal resin composition comprising a step of simultaneously melt-kneading a polyacetal resin (I) and, per 100 parts by weight thereof, more than 5 parts by weight but less than 100 parts by weight of calcium carbonate (II) which has an average particle diameter of from 0.1 μm to less than 1.5 μm and an average aspect ratio (L/D) which is a ratio of average major axis (L) of particles to average minor axis (D) of particles of 3 or less and which is not surface-treated with a saturated fatty acid, unsaturated fatty acid and metal salt thereof having 8 to 32 carbon atoms, and 0.005 to 10 parts by weight of an organic acid (III), at melting point of the polyacetal resin (I) or higher. More specifically, the process comprises simultaneous kneading of both of the calcium carbonate (II) and the organic acid (III) such as a saturated or unsaturated fatty acid having 8 to 32 carbon atoms in a melted state of the polyacetal resin (I) without a step of surface-treating or coating the calcium carbonate (II) beforehand with a saturated or unsaturated fatty acid having 8 to 32 carbon atoms or a metal salt of the saturated or unsaturated fatty acid having 8 to 32 carbon atoms which corresponds to the organic acid (III) by Henschel coating or the like. In the production process, the reason why anti-creep life or the like is particularly excellent is not clear but is presumed that the polyacetal resin (I), the calcium carbonate (II), and the organic acid (III) form a good interface simultaneously to their dispersion.

The polyacetal resin composition of the invention has characteristics of excellent balance of thermal stability and mechanical properties, such as rigidity and toughness, and also excellent anti-creep life, fatigue resistance and acid resistance, but a polyacetal resin composition further comprising a polyalkylene glycol (V) added thereto in an amount of 0.1 to 10 parts by weight, preferably 0.3 to 5 parts by weight, more preferably 0.5 to 3 parts by weight, most preferably 1.0 to 2.0 parts by weight, per 100 parts by weight of the polyacetal resin composition is more excellent in acid resistance, particularly durability against sulfur oxides with maintaining the balance of mechanical properties such as rigidity and toughness, anti-creep life, and the like. Therefore, it can be expected to use it for parts which come into direct contact with gasoline fuel or diesel fuel, e.g., pump modules which are large-sized parts, and fuel valves, fuel tank flanges, fuel level gauges, and the like.

The above polyalkylene glycol (V) is a polycondensate obtained from an alkylene glycol as a monomer and is not particularly limited so long as it is known. For example, there may be mentioned polyethylene glycol, polypropylene glycol, polyethylene glycol-polypropylene glycol block copolymers, and the like.

With regard to the alkylene glycol, part or all of the terminals may be etherified with an aliphatic alcohol. For example, there may be mentioned polyethylene glycol oleyl ether, polyethylene glycol cetyl ether, polyethylene glycol stearyl ether, polyethylene glycol lauryl ether, polyethylene glycol tridecyl ether, polyethylene glycol nonylphenyl ether, polyethylene glycol octylphenyl ether, and the like.

In addition, with regard to the alkylene glycol, part or all of the terminals may be esterified with a fatty acid. Specifically, there may be mentioned polyethylene glycol monolaurate, polyethylene glycol monostearate, polyethylene glycol monooleate, and the like.

Of these, in view of cost, as a preferred polyalkylene glycol (V), there may be mentioned polyethylene glycol or polypropylene glycol. Furthermore, in view of excellent durability against an acid, the number-average molecular weight is preferably from 10,000 to 45,000, more preferably from 13,000 to 35,000, even more preferably from 15,000 to 25,000.

The method of adding and mixing the polyalkylene glycol (V) is not particularly limited and, for example, it may be added at the production of the polyacetal resin composition comprising the above (I) to (IV) or may be added to the polyacetal resin composition by the melt-kneading method or the masterbatch method.

In the invention, appropriate known additives can be further blended, if necessary, within the range where the purpose of the invention is not impaired. Specifically, there may be mentioned an antioxidant, a heat stabilizer, a weather-resistant (light) stabilizer, a mold-releasing agent, a slidability-imparting agent, a lubricant, a crystal nucleating agent, an inorganic filler, a conductive material, a thermoplastic resin and thermoplastic elastomer, a pigment, and the like.

The present polyacetal resin composition of the invention is excellent in a balance of thermal stability and mechanical properties, such as rigidity and toughness, also excellent in anti-creep life, fatigue resistance and acid resistance. In addition, it is excellent in warp of molded articles and weld strength, it can be used in parts of various applications. For example, it can be suitably used as mechanism parts such as gears, cams, sliders, levers, arms, clutches, felt clutches, idler gears, pulleys, rollers, logs, key stems, key tops, shutters, reels, shafts, hinges, shafts, bearings, and guides; resin parts of insert molding, chassis, trays, side plates, parts for office automation equipment such as printers and copiers, parts for camera or video equipment such as VTR (Video Tape Recorder), video movie, digital video camera, camera, and digital camera; music, picture or information equipment such as cassette players, DAT, LD (Laser Disk), MD (Mini Disk), CD (Compact Disk) [including CD-ROM (Read Only Memory), CD-R (Recordable) and CD-RW (Rewritable)], DVD (Digital Video Disk) [including DVD-ROM, DVD-R, DVD-RW, DVD-RAM (Random Access Memory) and DVD Audio]; other optical disk drives, MFD, MO, navigation system, and mobile personal computer; communication equipment such as portable telephone and facsimile; parts for electric devices, parts for electronic devices, automobile parts such as fuel-related parts, e.g. gasoline fuel or diesel fuel tanks, fuel pump modules, valves, gasoline tank flanges, etc.; door-related parts, e.g. door locks, door handles, window regulators, speaker grills, etc.; seat belt-related parts, e.g. seat belt slip rings, press buttons, etc.; combination switch parts, switches and parts of clips; pen tips of mechanical pencils and mechanism parts for taking in or out of lead of mechanical pencils; wash-basin and drains, and mechanism parts for opening and closing waste plug, rocking mechanism for drawspan of vending machines and parts for goods-discharging mechanism; code stoppers, adjusters, and bottoms for cloths; water spray nozzles and connecting joints for water-spray hoses; building articles such as handrails for stairs, supports for floorings, and structural parts for electric shutters; disposable cameras; toys; playing machine-related ones such as pachinko and pinball machines; fastners; chains; conveyors; buckles; rollers; reduction equipment; joints; sport article parts; vending machines; furniture; musical instruments; and industrial parts such as furniture-housing facility-related devices.

EXAMPLES

The following will describe the invention further in detail with reference to Examples, but the invention is not limited to the following examples. In this connection, evaluation described in the following Examples and Comparative Examples was carried out by the following methods.

(1) Melt Flow Index (MFI: g/10 min.)

Measured under conditions of 190° C. and 2,160 g using MELT INDEXER, manufactured by Toyo Seiki K.K. according to ASTM-D1238.

(2) Measurement of Formaldehyde-Generating Rate (ppm/min.) of Polyacetal Resin and Polyacetal Resin Composition Under a nitrogen stream (50 NL/hr), 3 g of pellets of the polyacetal resin or polyacetal resin composition subjected to drying treatment at 140° C. for 1 hour beforehand was heated to melt at 220° C. and formaldehyde generated was absorbed in water and then titrated by a sodium sulfite method. At that time, when the amount (ppm) of formaldehyde generated from the start of heating until 2 minutes later was taken as $Y_2$, the amount until 10 minutes later as $Y_{10}$, the amount until 30 minutes later as $Y_{30}$, the amount until 50 minutes later as $Y_{50}$, and the amount until 90 minutes later as $Y_{90}$, the formaldehyde-generating rates were calculated as follows:

Generating rate from 2 minutes to 10 minutes: $(Y_{10}-Y_2)/8$ (ppm/min.),

Generating rate from 10 minutes to 30 minutes: $(Y_{30}-Y_{10})/20$ (ppm/min.), and Generating rate from 50 minutes to 90 minutes: $(Y_{90}-Y_{50})/40$ (ppm/min.). These values are derived from the formaldehyde attached to the polyacetal resin, derived from the formaldehyde generated by decomposition of terminals of the polyacetal resin, and derived from the formaldehyde generated by decomposition of main chain of the polyacetal resin, respectively. The smaller these values are, the more excellent the thermal stability is.

(3) Observation on Scanning Electron Microscope (SEM)

The average particle diameter, average aspect ratio (measurement of average major axis and average minor axis), and shape of particles of calcium carbonate and coupling agent-treated calcium carbonate were observed and determined using the following apparatus:

Fine coater: JFC-1600 manufactured by JOEL Ltd. Coating was conducted under conditions of 30 mA and 60 seconds;

Scanning electron microscope: JSM-6700F manufactured by JOEL Ltd.

Measurement was conducted under conditions of a acceleration voltage of 9.00 kV and an applied current of 10.0 μA.

The average particle diameter was determined by measuring each length of at least 100 particles randomly selected from the obtained particle image, followed by calculation according to the expression:

Average particle diameter=average major axis=$\Sigma L_i^2 N_i / \Sigma L_i N_i$.

The average aspect ratio was determined by measuring each major axis and minor axis of at least 100 particles randomly selected from the obtained particle image, followed by calculation according to the expressions:

Average major axis=$\Sigma L_i^2 N_i / \Sigma L_i N_i$

Average minor axis=$\Sigma d_i^2 N_i / \Sigma d_i N_i$

Average aspect ratio $L/d=(\Sigma L_i^2 N_i / \Sigma L_i N_i)/(\Sigma d_i^2 N_i / \Sigma d_i N_i)$.

(4) Quantitative Determination of Ca, Na, and Sr in Calcium Carbonate and Polyacetal Resin Composition and Calculation of Amounts of Na and Sr Relative to Ca 0.5 g of calcium carbonate or a polyacetal resin composition was weighed in a platinum dish and carbonized in an electric furnace at 500° C. After cooling, 5 mL of hydrochloric acid and 5 mL of pure water were added thereto and the whole was boiled to dissolve on a heater. After cooling, pure water was added to adjust the concentration to a measurable level and quantitative determination was carried out by a high-frequency inductively-coupled plasma (IPC) emission spectrometry using IRIS/IP manufactured by Thermo Jarrell Ash based on a characteristic wavelength of each metal. Thereafter, the amounts of Na and Sr relative to Ca were calculated.

(5) Observation on Transmission Electron Microscope (TEM) Observation of Maximum Aggregated Particle Diameter A TYPE I test piece of ASTM D638 was formed under injection molding conditions of an injection of 15 seconds and cooling of 25 seconds using an injection molding machine (SH-75 manufactured by Sumitomo Heavy Industries, Ltd.) with setting a cylinder temperature of 200° C. and a mold temperature of 70° C., and an ultra-thin piece of about 50 nm was cut out of a face perpendicular to the resin flown direction at the central part of the test piece by means of a cryomicrotome manufactured by ReichertNissei. In the observation on a transmission electron microscope (TEM), a bright-field image having a magnitude of 5,000 to 30,000 was photographed using HF 2000 manufactured by Hitachi Corporation and maximum size of each secondary aggregated particles was measured, a maximum value of the values being regarded as the maximum aggregated particle diameter. However, when the size of each particle formed is obviously larger than the average particle diameter of calcium carbonate added, it is judged to be other additive and thus was excluded from the measurement.

(6) Physical Properties of Polyacetal Resin Composition

A dumbbell piece or strip piece for evaluation was obtained under injection molding conditions of an injection of 15 seconds and cooling of 25 seconds using an injection molding machine (SH-75 manufactured by Sumitomo Heavy Industries, Ltd.) with setting cylinder temperature at 200° C. and mold temperature at 70° C. Evaluation was conducted according to the following items.

(6-1) Stability of Plasticizing Step at Molding

The stability of the plasticizing step was evaluated on the following items.

A plasticizing time was stable.
B plasticizing time slightly varied.
C plasticizing time varied and a problem of idling of screw arose.

(6-2) Flexural Elastic Modulus (GPA) and Flexural strength (MPa)

Measured in accordance with ASTM D790.

(6-3) Tensile Elongation (%) and Tensile Strength (Mpa)

Measured in accordance with ASTM D638.

(6-4) Izod Impact Strength with Notch

Measured in accordance with ASTM D256.

(6-5) Acid Resistance Test

A JIS No. 3 type dumbbell piece for evaluation was obtained under injection molding conditions of an injection of 15 seconds and cooling of 25 seconds using an injection molding machine (SH-75 manufactured by Sumitomo Heavy Industries, Ltd.) with setting cylinder temperature at 200° C. and mold temperature at 70° C. The dumbbell piece was placed in a glass pressure bottle, a mixed aqueous solution prepared by mixing equal volumes of 0.1N aqueous formic acid solution and 0.1N aqueous sulfuric acid solution was added thereto, and the bottle was tightly sealed, followed by heat treatment at 130±5° C. for 3 and 6 hours. Then, the dumbbell piece was washed with tap water and dried at 23° C. under a humidity of 50% for 48 hours. At that time, the weight loss, retention of tensile strength (the following expression), and tensile elongation after the test were determined.

Weight loss=(Weight of dumbbell piece after test)/(Weight of dumbbell piece before test)×100 (%)

Retention of tensile strength=(Tensile strength after test)/(Tensile strength before test)×100 (%)

(6-6) Sliding Test

Using a pin/plate tester AFT-15MS manufactured by Toyo Precision Parts Mfg. Co. Ltd., SUS 314 was set at the pin side and the dumbbell piece for evaluation at the plate side. Test was conducted under conditions of a reciprocating time of 30 mm/s and a reciprocating distance of 20 mm, a load of 2 kg, a temperature of 25° C., and a humidity of 50%. At that time, friction coefficient at reciprocation of 5000 times was measured and the scraped amount of the dumbbell piece after completion of the test was measured as abrasion depth (μm).

(6-7) Creep Test

Using a creep tester 100-6 manufactured by Toyo Seimitsu Seisakusyo K.K., the JIS No. 3 type dumbbell test piece was tested under conditions of a load stress of 10 MPa and a temperature of 130° C. and time required until the tensile test piece is broken was compared.

Moreover, the following components were used in Examples and Comparative Examples.

<Polyacetal Resins>

(a-1) Polyacetal resin (Copolymer) of Asahi Kasei Chemicals Corporation, Tenac (registered trademark) HC450
MFI=10 g/10 min.
Formaldehyde-generating rate:

$(Y_{10}-Y_2)/8$ (ppm/min.)=6

$(Y_{30}-Y_{10})/20$ (ppm/min.)=8

$(Y_{90}-Y_{50})/40$ (ppm/min.)=7

(a-2) Mixture of 65 parts by weight of polyacetal resin (copolymer) of Asahi Kasei Chemicals Corporation, Tenac (registered trademark) HC450 and 35 parts by weight of polyacetal resin (copolymer) of Asahi Kasei Chemicals Corporation, Tenac (registered trademark) HC750
MFI=15 g/10 min.
Formaldehyde-generating rate:

$(Y_{10}-Y_2)/8$ (ppm/min.)=7

$(Y_{30}-Y_{10})/20$ (ppm/min.)=10

$(Y_{90}-Y_{50})/40$ (ppm/min.)=7

(a-3) Polyacetal resin (copolymer) of Asahi Kasei Chemicals Corporation, Tenac (registered trademark) 4520
MFI=10 g/10 min.
Formaldehyde-generating rate:

$(Y_{10}-Y_2)/8$ (ppm/min.)=3

$(Y_{30}-Y_{10})/20$ (ppm/min.)=4

$(Y_{90}-Y_{50})/40$ (ppm/min.)=3

(a-4) Polyacetal resin (Block Copolymer) of Asahi Kasei Chemicals Corporation, Tenac (registered trademark) AC450
MFI=10 g/10 min.
Formaldehyde-generating rate:

$(Y_{10}-Y_2)/8$ (ppm/min.)=4

$(Y_{30}-Y_{10})/20$ (ppm/min.)=3

$(Y_{90}-Y_{50})/40$ (ppm/min.)=8

(a-5) Polyacetal resin (Homopolymer) of Asahi Kasei Chemicals Corporation, Tenac (registered trademark) 4010
MFI=10 g/10 min.
Formaldehyde-generating rate:

$(Y_{10}-Y_2)/8$ (ppm/min.)=2

$(Y_{30}-Y_{10})/20$ (ppm/min.)=3

$(Y_{90}-Y_{50})/40$ (ppm/min.)=2

<Calcium Carbonate>
(b-1) Kalfain 200M manufactured by Maruo Calcium Co. Ltd.
(b-2) Calcium carbonate manufactured by Konoshima Chemical Co., Ltd.
(b-3) A product obtained by adding 3 parts by weight of stearic acid (F-3 manufactured by Kawaken Fine Chemicals Co., Ltd.) to 100 parts by weight of calcium carbonate manufactured by Konoshima Chemical Co., Ltd. and stirring them in Henschel mixer at 120° C. at 5000 rpm for 10 minutes, followed by surface treatment
(b-4) MSK-PO manufactured by Maruo Calcium Co. Ltd.
(b-5) Brilliant-15 manufactured by Shiraishi Kogyo Kaisha Ltd.
(b-6) A product obtained by similarly subjecting Brilliant-15 manufactured by Shiraishi Kogyo Kaisha Ltd. (b-5) to surface treatment with stearic acid
(b-7) Kaltex 5 manufactured by Maruo Calcium Co. Ltd.
(b-8) A product obtained by subjecting Kaltex 5 manufactured by Maruo Calcium Co. Ltd. (b-7) to surface treatment with stearic acid similarly to (b-6)
(b-9) Nanocoat S-25 manufactured by Maruo Calcium Co. Ltd.
(b-10) PC manufactured by Shiraishi Kogyo Kaisha Ltd.
(b-11) A product obtained by subjecting PC manufactured by Shiraishi Kogyo Kaisha Ltd. (b-10) to surface treatment with stearic acid similarly to (b-6)
(b-12) Silver W manufactured by Shiraishi Kogyo Kaisha Ltd.
(b-13) A product obtained by subjecting Silver W manufactured by Shiraishi Kogyo Kaisha Ltd. (b-12) to surface treatment with stearic acid similarly to (b-6)
(b-14) Super S manufactured by Maruo Calcium Co. Ltd.
(b-15) A product obtained by subjecting Super S manufactured by Maruo Calcium Co. Ltd. (b-14) to surface treatment with stearic acid similarly to (b-6)
(b-16) R heavy carbonate manufactured by Maruo Calcium Co. Ltd.
(b-17) A product obtained by subjecting R heavy carbonate manufactured by Maruo Calcium Co. Ltd. (b-16) to surface treatment with stearic acid similarly to (b-6)

<Organic Acid>
(c-1) Stearic acid (F-3 manufactured by Kawaken Fine Chemicals Co., Ltd.)

<Fatty Acid Ester>
(d-1) Ethylene glycol distearate (Unistar E275 manufactured by NOF Corporation)

<Polyalkylene Glycols>
(e-1) Ethylene glycol (PEG-20000 manufactured by Sanyo Chemical Industries, Ltd.)
(e-2) Ethylene glycol (PEG-6000P manufactured by Sanyo Chemical Industries, Ltd.)

<Other Additive>
(f-1) Hydrotalcite $Mg_{4.3}Al_2(OH)_{12} \cdot 6CO_3$ (DHT-4C manufactured by Kyowa Chemical Industry Co., Ltd.)

[Various Physical Properties of Calcium Carbonate]
Table 1 shows kind, average particle diameter, average aspect ratio, and the like of calcium carbonates used.

Examples 1 to 30 and Comparative Examples 1 to 22

Polyacetal resin, calcium carbonate, organic acid, and the like were weighed in blending amounts shown in Tables 2 to 6. Using a twin-screw extruder (PCM-30 manufactured by Ikegai Ltd.), each of them was added from the top of the extruder and the whole was melt-kneaded to obtain a polyacetal resin composition. At that time, the melt-kneading was conducted under conditions of a temperature of 200° C. and a rotation number of 150 rpm. The evaluation results are shown in Tables 2 to 6.

TABLE 1

| | Calcium carbonate | | | | | | | | | | | | | | | | |
|---|---|---|---|---|---|---|---|---|---|---|---|---|---|---|---|---|---|
| | b-1 | b-2 | b-3 | b-4 | b-5 | b-6 | b-7 | b-8 | b-9 | b-10 | b-11 | b-12 | b-13 | b-14 | b-15 | b-16 | b-17 |
| Kind | light | light | light | light | light | light | heavy | heavy | heavy | light | light | light | light | heavy | heavy | heavy | heavy |
| Average particle diameter (μm) | 0.05 | 0.08 | 0.08 | 0.15 | 0.20 | 0.20 | 0.6 | 0.6 | 1.0 | 1.2 | 1.2 | 2.0 | 2.0 | 4.0 | 4.0 | 40 | 40 |
| Average aspect ratio (L/d) | 1.0 | 1.0 | 1.0 | 1.0 | 1.0 | 1.0 | 1.0 | 1.0 | 1.0 | 2.5 | 2.5 | 3.8 | 3.8 | 1.0 | 1.0 | 1.0 | 1.0 |
| BET adsorbed amount | 16 | 18 | 17 | 10 | 12 | 12 | 9 | 9 | 9 | 5 | 5 | 6 | 6 | 5 | 5 | 3 | 3 |

TABLE 1-continued

| | Calcium carbonate | | | | | | | | | | | | | | | | |
|---|---|---|---|---|---|---|---|---|---|---|---|---|---|---|---|---|---|
| | b-1 | b-2 | b-3 | b-4 | b-5 | b-6 | b-7 | b-8 | b-9 | b-10 | b-11 | b-12 | b-13 | b-14 | b-15 | b-16 | b-17 |
| Amount of Na relative to Ca (ppm) | 700 | 750 | 750 | 560 | 50 | 50 | 30 | 30 | 15 | 30 | 30 | 30 | 30 | 20 | 20 | 20 | 20 |
| Amount of Sr relative to Ca (ppm) | 260 | 700 | 700 | 220 | 820 | 820 | 330 | 330 | 330 | 790 | 790 | 1030 | 1030 | 400 | 400 | 380 | 380 |
| Surface treatment with fatty acid | yes | no | yes | yes | no | yes | no | yes | yes | no | yes | no | yes | no | yes | no | yes |

TABLE 2

| | Ex. 1 | Ex. 2 | Ex. 3 | Ex. 4 | Ex. 5 | Ex. 6 | Ex. 7 | Ex. 8 | Ex. 9 | Ex. 10 | Com. Ex. 1 | Com. Ex. 2 |
|---|---|---|---|---|---|---|---|---|---|---|---|---|
| Polyacetal resin | | | | | | | | | | | | |
| Kind | a-1 | a-1 | a-1 | a-1 | a-1 | a-1 | a-1 | a-1 | a-1 | a-1 | a-1 | a-1 |
| Amount added | 100 | 100 | 100 | 100 | 100 | 100 | 100 | 100 | 100 | 100 | 100 | 100 |
| Calcium carbonate | | | | | | | | | | | | |
| Kind | b-5 | b-5 | b-5 | b-5 | b-6 | b-6 | b-10 | b-10 | b-11 | b-11 | — | b-5 |
| Crystal | light | light | light | light | light | light | light | light | light | light | — | light |
| Average particle diameter (μm) | 0.20 | 0.20 | 0.20 | 0.20 | 0.20 | 0.20 | 1.2 | 1.2 | 1.2 | 1.2 | — | 0.20 |
| Average aspect ratio (L/d) | 1.0 | 1.0 | 1.0 | 1.0 | 1.0 | 1.0 | 2.5 | 2.5 | 2.5 | 2.5 | — | 1.0 |
| Surface treatment with fatty acid | no | no | no | no | yes | yes | no | no | yes | yes | — | no |
| Amount added | 10 | 20 | 30 | 40 | 20.6 | 41.2 | 20 | 40 | 20.6 | 41.2 | — | 20 |
| Organic acid | | | | | | | | | | | | |
| Kind | c-1 | c-1 | c-1 | c-1 | (c-1) | (c-1) | c-1 | c-1 | (c-1) | (C-1) | — | — |
| Amount added | 0.3 | 0.60 | 0.90 | 1.20 | (0.60)* | (1.20)* | 0.60 | 1.20 | (0.60)* | (1.20)* | — | — |
| Physical properties of resin composition | | | | | | | | | | | | |
| Amount of Na to Ca | 50 | 50 | 50 | 50 | 50 | 50 | 30 | 30 | 30 | 30 | less than 1 | less than 1 |
| Amount of Sr to Ca | 820 | 820 | 820 | 820 | 820 | 820 | 790 | 790 | 790 | 790 | less than 1 | less than 1 |
| Formaldehyde-generating rate (ppm/min) | | | | | | | | | | | | |
| 2 to 10 min | 12 | 18 | 22 | 26 | 16 | 25 | 21 | 30 | 24 | 26 | 7 | 50 |
| 10 to 30 min | 10 | 14 | 15 | 24 | 14 | 22 | 12 | 21 | 11 | 22 | 8 | 66 |
| 50 to 90 min | 10 | 16 | 17 | 28 | 15 | 25 | 12 | 23 | 11 | 22 | 7 | 100 or more colored brown and foamed through melt-kneading, thus difficult to mold |
| Flexural elastic modulus (GPa) | 3.02 | 3.28 | 3.50 | 3.85 | 3.18 | 3.79 | 3.26 | 3.88 | 3.18 | 3.80 | 2.75 | |
| Flexural strength (MPa) | 92 | 89 | 85 | 81 | 87 | 80 | 88 | 82 | 87 | 82 | 92 | |
| Tensile elongation (%) | 40 | 45 | 51 | 38 | 45 | 32 | 43 | 43 | 43 | 24 | 42 | |
| Tensile strength (MPa) | 55 | 50 | 44 | 40 | 50 | 42 | 51 | 43 | 50 | 42 | 62 | |
| Izod with notch (J/m) | 72 | 71 | 67 | 65 | 66 | 61 | 63 | 46 | 63 | 48 | 60 | |
| Creep test 10 MPa, 130° C. | | | | | | | | | | | | |
| Break time (min) | — | 1420 | — | 630 | — | 1450 | — | 960 | — | — | 1300 | |

TABLE 2-continued

|  | Ex. 1 | Ex. 2 | Ex. 3 | Ex. 4 | Ex. 5 | Ex. 6 | Ex. 7 | Ex. 8 | Ex. 9 | Ex. 10 | Com. Ex. 1 | Com. Ex. 2 |
|---|---|---|---|---|---|---|---|---|---|---|---|---|
| Acid-resistant test | | | | | | | | | | | | |
| Weight loss after 3 h (wt %) | — | 7.5 | — | — | 7.1 | — | 8.4 | — | 7.6 | — | 16.5 | |
| Weight loss after 6 h (wt %) | — | 10.2 | — | — | 10.3 | — | 10.5 | — | 11.0 | — | 35.2 | |

*The amount of surface treatment to calcium carbonate is described.

TABLE 3

|  | C. Ex. 3 | C. Ex. 4 | C. Ex. 5 | C. Ex. 6 | C. Ex. 7 | C. Ex. 8 | C. Ex. 9 |
|---|---|---|---|---|---|---|---|
| Polyacetal resin | | | | | | | |
| Kind | a-1 | a-1 | a-1 | a-1 | a-1 | a-1 | a-1 |
| Amount added | 100 | 100 | 100 | 100 | 100 | 100 | 100 |
| Calcium carbonate | | | | | | | |
| Kind | b-1 | b-2 | b-3 | b-4 | b-7 | b-8 | b-12 |
| Crystal | light | light | light | light | heavy | heavy | heavy |
| Average particle diameter (μm) | 0.05 | 0.08 | 0.08 | 0.15 | 0.6 | 0.6 | 1.0 |
| Average aspect ratio (L/d) | 1.0 | 1.0 | 1.0 | 1.0 | 1.0 | 1.0 | 1.0 |
| Surface treatment with fatty acid | yes | no | yes | yes | no | yes | yes |
| Amount added | 20.6 | 20 | 20.6 | 20.6 | 20 | 20.6 | 20.6 |
| Organic acid | treated | | treated | treated | | treated | treated |
| Kind | | c-1 | (c-1) | | c-1 | (c-1) | |
| Amount added | | 0.60 | (0.60)* | | 0.60 | (0.60)* | |
| Physical properties of resin composition | | | | | | | |
| Amount of Na to Ca (ppm) | 700 | 750 | 750 | 560 | 30 | 30 | 15 |
| Amount of Sr to Ca (ppm) | 260 | 700 | 700 | 220 | 330 | 330 | 330 |
| Formaldehyde-generating rate (ppm/min) | | | | | | | |
| 2 to 10 min | 55 | 48 | 49 | 25 | 21 | 20 | 21 |
| 10 to 30 min | 42 | 33 | 35 | 21 | 20 | 22 | 22 |
| 50 to 90 min | 32 | 28 | 27 | 22 | 19 | 21 | 19 |
| Flexural elastic modulus (GPa) | 3.28 | 3.35 | 3.32 | 3.25 | 3.20 | 3.20 | 3.20 |
| Flexural strength (MPa) | 90 | 91 | 90 | 90 | 88 | 89 | 89 |
| Tensile elongation (%) | 33 | 27 | 27 | 35 | 44 | 42 | 44 |
| Tensile strength (MPa) | 50 | 51 | 51 | 51 | 50 | 50 | 51 |
| Izod with notch (J/m) | 41 | 44 | 44 | 59 | 63 | 60 | 51 |
| Creep test 10 MPa, 130° C. | | | | | | | |
| Break time (min) | 890 | 770 | 740 | 600 | 450 | 450 | 340 |
| Acid-resistant test | | | | | | | |
| Weight loss after 3 h (wt %) | 6.7 | 6.9 | 6.9 | 6.9 | 8.5 | 7.7 | 7.8 |
| Weight loss after 6 h (wt %) | 10.1 | 10.2 | 10.1 | 10.1 | 10.3 | 10.4 | 11.2 |

|  | C. Ex. 10 | C. Ex. 11 | C. Ex. 12 | C. Ex. 13 | C. Ex. 14 | C. Ex. 15 |
|---|---|---|---|---|---|---|
| Polyacetal resin | | | | | | |
| Kind | a-1 | a-1 | a-1 | a-1 | a-1 | a-1 |
| Amount added | 100 | 100 | 100 | 100 | 100 | 100 |
| Calcium carbonate | | | | | | |
| Kind | b-13 | b-14 | b-15 | b-16 | b-16 | b-17 |
| Crystal | light | light | heavy | heavy | heavy | heavy |

TABLE 3-continued

|  |  |  |  |  |  |  |
|---|---|---|---|---|---|---|
| Average particle diameter (μm) | 2.0 | 2.0 | 4.0 | 4.0 | 40 | 40 |
| Average aspect ratio (L/d) | 3.8 | 3.8 | 1.0 | 1.0 | 1.0 | 1.0 |
| Surface treatment with fatty acid | no | yes | no | yes | no | yes |
| Amount added | 20 | 20.6 | 20 | 20.6 | 20 | 20.6 |
| Organic acid |  |  |  |  |  |  |
| Kind | c-1 | (c-1) | c-1 | (c-1) | c-1 | (c-1) |
| Amount added | 0.60 | (0.60)* | 0.60 | (0.60)* | 0.60 | (0.60)* |
| Physical properties of resin composition |  |  |  |  |  |  |
| Amount of Na to Ca (ppm) | 30 | 30 | 20 | 20 | 20 | 20 |
| Amount of Sr to Ca (ppm) | 1030 | 1030 | 400 | 400 | 380 | 380 |
| Formaldehyde-generating rate (ppm/min) |  |  |  |  |  |  |
| 2 to 10 min | 25 | 25 | 28 | 30 | 35 | 35 |
| 10 to 30 min | 19 | 20 | 25 | 24 | 29 | 30 |
| 50 to 90 min | 18 | 18 | 20 | 19 | 28 | 27 |
| Flexural elastic modulus (GPa) | 3.29 | 3.24 | 3.01 | 2.94 | 2.93 | 2.81 |
| Flexural strength (MPa) | 89 | 89 | 85 | 84 | 84 | 83 |
| Tensile elongation (%) | 45 | 50 | 25 | 19 | 17 | 10 |
| Tensile strength (MPa) | 52 | 52 | 49 | 49 | 49 | 49 |
| Izod with notch (J/m) | 45 | 45 | 35 | 36 | 34 | 34 |
| Creep test 10 MPa, 130° C. |  |  |  |  |  |  |
| Break time (min) | 1190 | 1270 | 250 | 250 | 160 | 150 |
| Acid-resistant test |  |  |  |  |  |  |
| Weight loss after 3 h (wt %) | 8.5 | 7.6 | 8.9 | 7.9 | 8.8 | 7.6 |
| Weight loss after 6 h (wt %) | 10.7 | 11.0 | 11.7 | 12.1 | 11.8 | 11 |

*The amount of surface treatment to calcium carbonate is described.

TABLE 4

|  | Ex. 11 | Ex. 12 | Ex. 13 | Ex. 14 | Ex. 15 | Ex. 16 | Ex. 17 | Ex. 18 | Ex. 19 | C. Ex. 16 | C. Ex. 17 | C. Ex. 18 |
|---|---|---|---|---|---|---|---|---|---|---|---|---|
| Polyacetal resin |  |  |  |  |  |  |  |  |  |  |  |  |
| Kind | a-3 | a-3 | a-3 | a-4 | a-4 | a-4 | a-5 | a-5 | a-5 | a-3 | a-4 | a-5 |
| Amount added | 100 | 100 | 100 | 100 | 100 | 100 | 100 | 100 | 100 | 100 | 100 | 100 |
| Calcium carbonate |  |  |  |  |  |  |  |  |  |  |  |  |
| Kind | b-5 | b-5 | b-5 | b-5 | b-5 | b-5 | b-5 | b-5 | b-5 | — | — | — |
| Crystal | light | light | light | light | light | light | light | light | light | — | — | — |
| Average particle diameter (μm) | 0.20 | 0.20 | 0.20 | 0.20 | 0.20 | 0.20 | 0.20 | 0.20 | 0.20 | — | — | — |
| Average aspect ratio (L/d) | 1.0 | 1.0 | 1.0 | 1.0 | 1.0 | 1.0 | 1.0 | 1.0 | 1.0 | — | — | — |
| Surface treatment with fatty acid | no | no | no | no | no | no | no | no | no | — | — | — |
| Amount added | 10 | 20 | 30 | 10 | 20 | 30 | 10 | 20 | 30 | — | — | — |
| Organic acid |  |  |  |  |  |  |  |  |  |  |  |  |
| Kind | c-1 | c-1 | c-1 | c-1 | c-1 | c-1 | c-1 | c-1 | c-1 |  |  | — |
| Amount added | 0.30 | 0.60 | 0.90 | 0.30 | 0.60 | 0.90 | 0.30 | 0.60 | 0.90 |  |  |  |
| Physical properties of resin composition |  |  |  |  |  |  |  |  |  |  |  |  |
| Amount of Na to Ca (ppm) | 50 | 50 | 50 | 50 | 50 | 50 | 50 | 50 | 50 | less than 1 | less than 1 | less than 1 |
| Amount of Sr to Ca (ppm) | 820 | 820 | 820 | 820 | 820 | 820 | 820 | 820 | 820 | less than 1 | less than 1 | less than 1 |
| Flexural elastic modulus (GPa) | 2.72 | 2.95 | 3.23 | 2.32 | 2.43 | 2.56 | 3.42 | 3.77 | 4.15 | 2.49 | 2.41 | 3.07 |
| Flexural strength (MPa) | 85 | 82 | 78 | 78 | 75 | 72 | 100 | 100 | 96 | 85 | 86 | 100 |
| Tensile elongation (%) | 40 | 43 | 45 | 40 | 61 | 50 | 27 | 27 | 26 | 42 | 37 | 35 |

TABLE 4-continued

|  | Ex. 11 | Ex. 12 | Ex. 13 | Ex. 14 | Ex. 15 | Ex. 16 | Ex. 17 | Ex. 18 | Ex. 19 | C. Ex. 16 | C. Ex. 17 | C. Ex. 18 |
|---|---|---|---|---|---|---|---|---|---|---|---|---|
| Tensile strength (MPa) | 49 | 44 | 39 | 47 | 42 | 39 | 60 | 54 | 50 | 58 | 55 | 68 |
| Izod with notch (J/m) | 65 | 68 | 63 | 87 | 79 | 73 | 62 | 58 | 58 | 60 | 61 | 68 |
| Creep test 10 MPa, 130° C. | | | | | | | | | | | | |
| Break time (min) | — | 980 | — | — | 330 | — | — | 2130 | — | 770 | 300 | 1800 |

TABLE 5

|  | Example 20 | Example 21 | Example 22 | Example 23 | Example 24 | Com. Example 19 |
|---|---|---|---|---|---|---|
| Polyacetal resin | | | | | | |
| Kind | a-2 | a-2 | a-2 | a-2 | a-2 | a-2 |
| Amount added | 100 | 100 | 100 | 100 | 100 | 100 |
| Calcium carbonate | | | | | | |
| Kind | b-5 | b-5 | b-5 | b-5 | b-5 | — |
| Crystal | light | light | light | light | light | — |
| Average particle diameter (μm) | 0.20 | 0.20 | 0.20 | 0.20 | 0.20 | — |
| Average aspect ratio (L/d) | 1.0 | 1.0 | 1.0 | 1.0 | 1.0 | — |
| Amount added | 20 | 20 | 20 | 20 | 20 | — |
| Organic acid | | | | | | |
| Kind | c-1 | c-1 | c-1 | c-1 | c-1 | — |
| Amount added | 0.60 | 0.60 | 0.60 | 0.60 | 0.60 | — |
| Fatty acid ester | | | | | | |
| Kind | — | d-1 | d-1 | d-1 | d-1 | — |
| Amount added | — | 0.06 | 0.20 | 1.0 | 4.0 | — |
| Stability of plasticization step at molding | A | A | B | C | C | A |
| Physical properties of resin composition | | | | | | |
| Amount of Na to Ca (ppm) | 50 | 50 | 50 | 50 | 50 | less than 1 |
| Amount of Sr to Ca (ppm) | 820 | 820 | 820 | 820 | 820 | less than 1 |
| Flexural elastic modulus (GPa) | 3.38 | 3.37 | 3.34 | 3.3 | 2.94 | 2.72 |
| Flexural strength (MPa) | 88 | 89 | 88 | 87 | 83 | 91 |
| Tensile elongation (%) | 51 | 39 | 41 | 26 | 29 | 45 |
| Tensile strength (MPa) | 49 | 48 | 49 | 48 | 47 | 61 |
| Izod with notch (J/m) | 68 | 65 | 65 | 65 | 58 | 60 |
| Sliding properties | | | | | | |
| Friction coefficient at first reciprocation | 0.17 | 0.11 | 0.12 | 0.14 | 0.14 | 0.14 |
| Friction coefficient at 5000th reciprocation | 0.21 | 0.39 | 0.33 | 0.32 | 0.15 | 0.33 |
| Increase in friction coefficient | 0.04 | 0.28 | 0.21 | 0.18 | 0.01 | 0.19 |
| Abrasion of test piece after 5000 times of reciprocation (μm) | 10 | 34 | 24 | 22 | 6 | 7 |

TABLE 6

|  | Ex. 25 | Ex. 26 | Ex. 27 | Ex. 28 | Ex. 29 | Ex. 30 | C. Ex. 19 | C. Ex. 20 | C. Ex. 21 | C. Ex. 22 |
|---|---|---|---|---|---|---|---|---|---|---|
| Polyacetal resin | | | | | | | | | | |
| Kind | a-2 | a-2 | a-2 | a-2 | a-2 | a-2 | a-2 | a-2 | a-2 | a-2 |
| Amount added | 100 | 100 | 100 | 100 | 100 | 100 | 100 | 100 | 100 | 100 |
| Calcium carbonate | | | | | | | | | | |
| Kind | b-5 | b-5 | b-5 | b-5 | b-5 | b-5 | — | — | — | — |
| Crystal | light | light | light | light | light | light | — | — | — | — |
| Average particle diameter (μm) | 0.20 | 0.20 | 0.20 | 0.20 | 0.20 | 0.20 | — | — | — | — |
| Average particle (L/d) | 1.0 | 1.0 | 1.0 | 1.0 | 1.0 | 1.0 | — | — | — | — |
| Amount added | 10 | 10 | 10 | 10 | 20 | 30 | — | — | — | — |
| Organic acid | | | | | | | | | | |
| Kind | c-1 | c-1 | c-1 | c-1 | c-1 | c-1 | — | — | — | — |
| Amount added | 0.3 | 0.3 | 0.3 | 0.3 | 0.6 | 0.9 | — | — | — | — |
| Polyalkylene glycol | | | | | | | | | | |
| Kind | e-1 | e-1 | e-1 | e-1 | e-1 | e-1 | — | e-1 | — | e-1 |
| Amount added | 1.0 | 2.0 | 1.0 | 2.0 | 1.0 | 0.5 | — | 1.0 | — | 1.0 |

TABLE 6-continued

| | Ex. 25 | Ex. 26 | Ex. 27 | Ex. 28 | Ex. 29 | Ex. 30 | C. Ex. 19 | C. Ex. 20 | C. Ex. 21 | C. Ex. 22 |
|---|---|---|---|---|---|---|---|---|---|---|
| Other additive | | | | | | | | | | |
| Kind | f-1 | f-1 | f-1 | f-1 | f-1 | f-1 | | f-1 | f-1 | |
| Amount added | 0.5 | 0.5 | 0.5 | 0.5 | 0.5 | 0.5 | | 0.5 | 0.5 | |
| Physical properties of resin composition | | | | | | | | | | |
| Amount of Na to Ca (ppm) | 50 | 50 | 50 | 50 | 50 | 50 | less than 1 | less than 1 | less than 1 | less than 1 |
| Amount of Sr to Ca (ppm) | 820 | 820 | 820 | 820 | 820 | 820 | less than 1 | less than 1 | less than 1 | less than 1 |
| Flexural elastic modulus (GPa) | 2.93 | 2.73 | 3.02 | 2.77 | 3.00 | 3.35 | 2.72 | 2.76 | 2.76 | 2.73 |
| Flexural strength (MPa) | 87 | 82 | 89 | 84 | 80 | 82 | 91 | 89 | 90 | 86 |
| Tensile elongation (%) | 27 | 35 | 30 | 26 | 71 | 44 | 45 | 33 | 30 | 35 |
| Tensile strength (MPa) | 55 | 53 | 57 | 55 | 47 | 43 | 61 | 59 | 61 | 59 |
| Izod with notch (J/m) | 62 | 65 | 60 | 60 | 75 | 69 | 60 | 52 | 57 | 52 |
| Acid resistance | | | | | | | | | | |
| Weight loss after 3 h wt % | 6.7 | 6.0 | 9.6 | 10.3 | 4.7 | 4.1 | 14.9 | 6.8 | 8.5 | 7.2 |
| Tensile strength retention after 3 h % | 99 | 100 | 95 | 95 | 100 | 98 | 92 | 93 | 94 | 92 |
| Tensile elongation after 3 h % | 23 | 27 | 20 | 21 | 56 | 61 | 12 | 23 | 16 | 20 |
| Weight loss after 6 h wt % | 10.8 | 9.8 | 14.3 | 15.1 | 6.3 | 5.2 | 31.6 | 19.3 | 24.2 | 20.2 |
| Tensile strength retention after 6 h % | 97 | 96 | 96 | 95 | 99 | 97 | 64 | 89 | 91 | 85 |
| Tensile elongation after 6 h % | 14 | 12 | 15 | 15 | 18 | 14 | 7 | 19 | 11 | 15 |

While the invention has been described in detail and with reference to specific embodiments thereof, it will be apparent to one skilled in the art that various changes and modifications can be made therein without departing from the spirit and scope thereof.

The present application is based on Japanese Patent Application No. 2004-012980 filed on Jan. 21, 2004, Japanese Patent Application No. 2004-091048 filed on Mar. 26, 2004, and Japanese Patent Application No. 2004-091049 filed on Mar. 26, 2004, and the contents are incorporated herein by reference.

INDUSTRIAL APPLICABILITY

The resin composition of the invention is excellent in a balance of thermal stability and mechanical properties, such as rigidity and toughness, also excellent in anti-creep life, fatigue resistance and acid resistance, so that it can be suitably used in various fields, such as automobile, electrical/electronic and other industries.

The invention claimed is:

1. A process for producing a polyacetal resin composition comprising a step of simultaneously melt-kneading:
(I) a polyacetal resin; and per 100 parts by weight thereof,
(II) more than 5 parts by weight but less than 100 parts by weight of calcium carbonate which has an average particle diameter of from 0.1 μm to less than 1.5 μm and an average aspect ratio (L/D) which is a ratio of average major axis (L) of particles to average minor axis (D) of particles of 3 or less and which is not surface-treated with a saturated fatty acid, unsaturated fatty acid and metal salt thereof having 8 to 32 carbon atoms; and
(III) 0.005 to 10 parts by weight of an organic acid,
at melting point of the polyacetal resin (I) or higher.

2. The process according to claim 1, wherein formaldehyde-generating rates, at the time when the polyacetal resin (I) is heated at 220° C. under an argon stream, for heating periods of from 2 minutes to 10 minutes, from 10 minutes to 30 minutes and from 50 minutes to 90 minutes are each 15 ppm/min or less.

3. The process according to claim 1, wherein the polyacetal resin (I) is a heat-stabilized polyacetal resin obtained by treating to stabilize thermally unstable terminals with at least one quaternary ammonium compound represented by the following formula:

$$[R^1R^2R^3R^4N^+]_n X^{-n}$$

wherein $R^1$, $R^2$, $R^3$, $R^4$ each independently represents an unsubstituted or substituted alkyl group having 1 to 30 carbon atoms, an aryl group having 6 to 20 carbon atoms, an aralkyl group in which an unsubstituted or substituted alkyl group having 1 to 30 carbon atoms is substituted with at least one aryl group having 6 to 20 carbon atoms, or an alkylaryl group in which an aryl group having 6 to 20 carbon atoms is substituted with at least one unsubstituted or substituted alkyl group having 1 to 30 carbon atoms, provided that the unsubstituted or substituted alkyl group may be any of linear, branched or cyclic, and that in the unsubstituted alkyl group, aryl group, aralkyl group or alkylaryl group, hydrogen atom(s) may be substituted with halogen(s); n represents an integer of 1 to 3; and X represents a hydrogen atom, or an acid residue of a carboxylic acid having 1 to 20 carbon atoms, a hydroacid, an oxo acid, an inorganic thio acid or an organic thio acid having 1 to 20 carbon atoms.

4. The process according to claim 1, wherein the polyacetal resin (I) is a copolymer having a melting point of 164 to 172° C.

5. The process according to claim 1, wherein in the calcium carbonate (II), the amount of Na relative to Ca is 250 ppm or less and the amount of Sr relative to Ca is from 500 to 2500 ppm.

6. The process according to claim 1, wherein the calcium carbonate (II) is light calcium carbonate.

7. The process according to claim 6, wherein the calcium carbonate (II) has an average particle diameter of from 0.1 μm to 1.0 μm.

8. The process according to claim 6, wherein the calcium carbonate (II) has a content of particles having a particle diameter of 1 μm or less of 90% or more.

9. The process according to claim 6, wherein the calcium carbonate (II) has a BET specific surface area of from 10 to 200 m²/g.

10. The process according to claim 6 wherein the calcium carbonate (II) comprises spherical particles, cubic particles, rectangular particles, amorphous particles, or a mixture thereof.

11. The process according to claim 1, wherein the organic acid (III) is a saturated fatty acid having 8 to 36 carbon atoms.

* * * * *